United States Patent
Kalai et al.

(10) Patent No.: US 8,803,920 B2
(45) Date of Patent: Aug. 12, 2014

(54) PRE-FETCHING MAP TILE DATA ALONG A ROUTE

(75) Inventors: Iljya Kalai, Zurich (CH); Michael Siliski, San Francisco, CA (US); Jerry Morrison, Mountain View, CA (US); Keith Ito, Cambridge, MA (US); Andrew T. Miller, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/546,143

(22) Filed: Jul. 11, 2012

(65) Prior Publication Data

US 2013/0147846 A1 Jun. 13, 2013

Related U.S. Application Data

(60) Provisional application No. 61/569,493, filed on Dec. 12, 2011.

(51) Int. Cl.
*G09G 5/00* (2006.01)

(52) U.S. Cl.
USPC .......................................... 345/660

(58) Field of Classification Search
CPC .. G06T 17/05; G06T 1/60; G09G 2340/0414; G06F 3/0481; G06F 2203/04806
See application file for complete search history.

(56) References Cited

U.S. PATENT DOCUMENTS

| | | | |
|---|---|---|---|
| 4,984,279 A | 1/1991 | Kidney et al. | |
| 5,345,086 A | 9/1994 | Bertram | |
| 5,793,310 A | 8/1998 | Watanabe et al. | |
| 6,094,685 A | 7/2000 | Greenberg et al. | |
| 6,199,150 B1 | 3/2001 | Yoshikawa | |
| 6,330,453 B1 | 12/2001 | Suzuki et al. | |
| 6,400,690 B1 | 6/2002 | Liu et al. | |
| 6,442,757 B1 | 8/2002 | Hancock et al. | |
| 6,453,233 B1 | 9/2002 | Kato | |
| 6,571,279 B1 | 5/2003 | Herz et al. | |
| 6,853,911 B1 | 2/2005 | Sakarya | |
| 7,006,820 B1 | 2/2006 | Parker et al. | |
| 7,136,748 B2 | 11/2006 | Umezu et al. | |
| 7,263,368 B2 | 8/2007 | Knauerhase et al. | |
| 7,315,259 B2 | 1/2008 | Sacks | |

(Continued)

FOREIGN PATENT DOCUMENTS

| | | |
|---|---|---|
| KR | 10-2008-071228 | 8/2008 |
| WO | WO-98/28714 A1 | 7/1998 |
| WO | WO-2009/027161 A1 | 3/2009 |

OTHER PUBLICATIONS

Kirchner et al. "A Location-aware Prefetchting Mechanism," Project work at Distributed Information Systems Laboratory LSIR (2004).

(Continued)

*Primary Examiner* — Kee M Tung
*Assistant Examiner* — Frank Chen
(74) *Attorney, Agent, or Firm* — Marshall, Gerstein & Borun LLP

(57) ABSTRACT

The present application describes techniques for fetching map data as a selected subset of entire map data available by selecting map data tiles corresponding to an area that encompasses a route. An amount of map data accessed may be adjusted based on a priority assigned to areas or points along the route. A sequence of map data may be accessed based on a priority assigned to sets of map data.

16 Claims, 11 Drawing Sheets

(56) References Cited

U.S. PATENT DOCUMENTS

| | | | |
|---|---|---|---|
| 7,327,349 B2 | 2/2008 | Robbins et al. |
| 7,464,109 B2 | 12/2008 | Modi |
| 7,502,780 B2 | 3/2009 | Thorpe |
| 7,502,876 B1 | 3/2009 | Nemirovsky et al. |
| 7,551,182 B2 | 6/2009 | Bethune et al. |
| 7,571,422 B2 | 8/2009 | Adel et al. |
| 7,577,520 B2 | 8/2009 | Nomura |
| 7,584,434 B2 | 9/2009 | Okamura |
| 7,610,147 B2 | 10/2009 | Umezu et al. |
| 7,663,671 B2 | 2/2010 | Gallagher et al. |
| 7,710,421 B2 | 5/2010 | Muramatsu |
| 7,711,473 B2 | 5/2010 | Sekine et al. |
| 7,734,412 B2 | 6/2010 | Shi et al. |
| 7,739,037 B2 | 6/2010 | Sumizawa et al. |
| 7,796,837 B2 | 9/2010 | Lueck |
| 7,831,383 B2 | 11/2010 | Oohashi |
| 7,831,387 B2 | 11/2010 | Golding et al. |
| 7,839,421 B2 | 11/2010 | Bethune et al. |
| 7,873,465 B2 | 1/2011 | Geelen et al. |
| 7,920,968 B2 | 4/2011 | Chapin et al. |
| 7,925,624 B2 | 4/2011 | Vosshall et al. |
| 7,925,982 B2 | 4/2011 | Parker et al. |
| 7,962,565 B2 | 6/2011 | Coker |
| 7,974,959 B2 | 7/2011 | Sawai et al. |
| 7,975,025 B1 | 7/2011 | Szabo et al. |
| 7,983,659 B2 | 7/2011 | Shinya |
| 7,996,445 B2 | 8/2011 | Fair et al. |
| 8,005,612 B2 | 8/2011 | Asahara et al. |
| 8,010,407 B1 | 8/2011 | Santoro et al. |
| 8,014,796 B2 | 9/2011 | Boudreau et al. |
| 8,032,297 B2 | 10/2011 | Jakobson |
| 8,060,389 B2 | 11/2011 | Johnson |
| 8,078,641 B2 | 12/2011 | Mao et al. |
| 8,095,307 B2 | 1/2012 | Ebert et al. |
| 8,204,966 B1 | 6/2012 | Mendis et al. |
| 8,280,414 B1 | 10/2012 | Nourse et al. |
| 2002/0133491 A1 | 9/2002 | Sim et al. |
| 2003/0187984 A1 | 10/2003 | Banavar et al. |
| 2004/0203998 A1 | 10/2004 | Knauerhase et al. |
| 2004/0220730 A1 | 11/2004 | Chen et al. |
| 2006/0026170 A1 | 2/2006 | Kreitler et al. |
| 2006/0067224 A1 | 3/2006 | Ohara |
| 2006/0069749 A1 | 3/2006 | Herz et al. |
| 2006/0080032 A1 | 4/2006 | Cooper et al. |
| 2006/0195256 A1 | 8/2006 | Nakamura et al. |
| 2006/0277271 A1 | 12/2006 | Morse et al. |
| 2007/0050128 A1 | 3/2007 | Lee et al. |
| 2007/0080830 A1 | 4/2007 | Sacks |
| 2007/0143014 A1 | 6/2007 | Sekine et al. |
| 2007/0242077 A1 | 10/2007 | Danan |
| 2007/0273558 A1 | 11/2007 | Smith et al. |
| 2007/0282915 A1 | 12/2007 | Vosshall et al. |
| 2008/0071988 A1 | 3/2008 | Schloter et al. |
| 2008/0082225 A1 | 4/2008 | Barrett |
| 2008/0102857 A1 | 5/2008 | Kim |
| 2008/0132249 A1 | 6/2008 | Hamilton |
| 2008/0177469 A1 | 7/2008 | Geelen et al. |
| 2008/0238723 A1 | 10/2008 | Fein et al. |
| 2008/0270579 A1 | 10/2008 | Herz et al. |
| 2008/0291205 A1* | 11/2008 | Rasmussen et al. ........... 345/441 |
| 2009/0063042 A1* | 3/2009 | Santesson et al. ............ 701/209 |
| 2009/0125228 A1 | 5/2009 | Dicke et al. |
| 2009/0128483 A1 | 5/2009 | Robbins et al. |
| 2009/0132163 A1 | 5/2009 | Ashley, Jr. et al. |
| 2009/0153563 A1 | 6/2009 | Tudose |
| 2009/0182500 A1 | 7/2009 | Dicke |
| 2009/0198767 A1 | 8/2009 | Jakobson et al. |
| 2009/0244095 A1 | 10/2009 | Bowman et al. |
| 2009/0281718 A1 | 11/2009 | Gibran et al. |
| 2009/0287750 A1 | 11/2009 | Banavar et al. |
| 2009/0319177 A1 | 12/2009 | Khosravy et al. |
| 2009/0319188 A1 | 12/2009 | Otto |
| 2009/0326810 A1 | 12/2009 | Callaghan et al. |
| 2010/0020091 A1* | 1/2010 | Rasmussen et al. .......... 345/582 |
| 2010/0106397 A1 | 4/2010 | Van Essen |
| 2010/0106801 A1* | 4/2010 | Bliss et al. .................... 709/219 |
| 2010/0117810 A1 | 5/2010 | Hagiwara et al. |
| 2010/0131186 A1 | 5/2010 | Geelen et al. |
| 2010/0153007 A1* | 6/2010 | Crowley ....................... 701/206 |
| 2010/0179940 A1 | 7/2010 | Gilder et al. |
| 2010/0250646 A1 | 9/2010 | Dunagan et al. |
| 2010/0274899 A1 | 10/2010 | Shrivastava et al. |
| 2010/0321399 A1 | 12/2010 | Ellren et al. |
| 2010/0333085 A1 | 12/2010 | Criddle et al. |
| 2011/0054776 A1 | 3/2011 | Petrov et al. |
| 2011/0093515 A1 | 4/2011 | Albanese |
| 2011/0095993 A1 | 4/2011 | Zuverink |
| 2011/0098917 A1 | 4/2011 | LeBeau et al. |
| 2011/0098918 A1 | 4/2011 | Siliski et al. |
| 2011/0161875 A1 | 6/2011 | Kankainen |
| 2011/0213798 A1 | 9/2011 | Osuka et al. |
| 2011/0276263 A1 | 11/2011 | Shimotani et al. |
| 2011/0300848 A1* | 12/2011 | Boudreau et al. ............. 455/419 |
| 2011/0316854 A1 | 12/2011 | Vandrovec |
| 2012/0022786 A1 | 1/2012 | Siliski et al. |
| 2012/0022787 A1 | 1/2012 | LeBeau et al. |
| 2012/0083995 A1* | 4/2012 | Vorona ......................... 701/119 |

OTHER PUBLICATIONS

Molina, "Aiming and Guiding Navigation with a Non-visual GPS Application," Department of Design Sciences Faculty of Engineering, Lund University (2010).
Office action for U.S. Appl. No. 13/244,717 dated Nov. 15, 2011.
Office action for U.S. Appl. No. 13/244,764 dated Nov. 28, 2011.
Piras et al., "Compact GML: merging mobile computing and mobile cartography," CRS4, Center for Advanced Studies, Research and Development in Sardinia (2004).
Reichenbacher et al., "The World in Your Pocket—Towards a Mobile Cartography," Proc. of the 20th International Cartographic Conference (2001).
Weber, "Mobile Map Browsers: Anticipated User Interaction for Data Pre-Fetching," Thesis, The University of Maine, (2010).
Google Developers, "Google Maps API," (2012). Retrieved from the Internet on Aug. 31, 2012: URL:https://developers.google.com/maps/.
International Search Report and Written Opinion for Application No. PCT/US2012/051574, dated Feb. 15, 2013.
International Search Report and Written Opinion for Application No. PCT/US2012/051577, dated Feb. 15, 2013.
International Search Report and Written Opinion for Application No. PCT/US2012/065002, dated Mar. 29, 2013.
International Search Report and Written Opinion for Application No. PCT/US2012/065008, dated Mar. 29, 2013.
International Search Report for Application No. PCT/US2012/051564, dated Feb. 18, 2013.
Mapquest, "JavaScript Maps API," (2012). Retrieved from the Internet on Aug. 31, 2012: URL:http://developer.mapquest.com/web/products/featured/javascript.
MSDN, "Get Started Using Bing Maps," (2012). Retrieved from the Internet on Aug. 31, 2012: URL:http://msdn.microsoft.com/en-us/library/dd877180.aspx.
Wiki, "API," (2012). Retrieved from the Internet on Aug. 31, 2012: URL:http://wiki.openstreetmap.org/wiki/API.
International Preliminary Report on Patentability for Application No. PCT/US2012/051564, dated Apr. 1, 2014.
International Preliminary Report on Patentability for Application No. PCT/US2012/065008, dated Jun. 10, 2014.
International Preliminary Report on Patentability for Application No. PCT/US2012/065002, dated May 20, 2014.
International Preliminary Report on Patentability for Application No. PCT/US2012/051574, dated Jun. 17, 2014.
International Preliminary Report on Patentability for Application No. PCT/US2012/051577, dated Jun. 17, 2014.

* cited by examiner

PRE-FETCHING MAP TILE DATA ALONG A ROUTE

CROSS-REFERENCE TO RELATED APPLICATION

The present application claims the benefit of U.S. Provisional Patent Application No. 61/569,493 filed Dec. 12, 2011, the disclosure of which is incorporated herein by reference in its entirety for all purposes.

FIELD OF TECHNOLOGY

The present disclosure relates to map rendering systems, such as electronic map display systems, and more specifically to a method of and system for pre-fetching map data from a remote database.

BACKGROUND

With the widespread use of mobile devices, such as mobile phones, personal data assistants, tablet personal computers, etc., consumer demand for ready access to varied types of data continues to grow at a high rate. These devices are used to transmit, receive, and store text, voice, image, and video data. Consumers often look to store large numbers of applications on these devices, such that mobile devices are often touted more for the number of available applications, than internal processor speed. While consumers have come to desire fast access to data, the sheer amount of data required to run these applications places a premium on data management, which may apply on both the device level and at the network level. This premium may limit the effectiveness of applications such as mapping applications, which may typically require comparatively large amounts of network data (e.g., for systems that retrieve map data from a remote database).

Mapping applications are found in a variety of mobile devices, including car navigation systems, hand-held GPS units, mobile phones, and portable computers. These applications are among the most frequently used applications and are considered, by some, necessary for personal safety. Although the underlying digital maps are easy to use from a user's perspective, creating a digital map is a data intensive process. Every digital map begins with a set of raw data corresponding to millions of streets and intersections. That raw map data is derived from a variety of sources, each providing different amounts and types of information. To effectively map a location, locate a driving route between a source and a destination, identify points of interest, etc. requires substantial amounts of data. Furthermore, many mapping applications require a display of different map data at different zoom levels, i.e., different scales, where the amount of detail and the nature of that detail changes at each zoom level. For example, at a lowest zoom level, scaled furthest away from a target, the map data may contain the boundaries of continents, oceans, and major landmasses. At subsequent zoom levels, that map data may identify countries, states, homelands, protectorates, other major geographic regions. While at even further subsequent zoom levels, that map data may contain major roads, cities, towns, until eventually the map data contains minor roads, buildings, down to even sidewalks and walk ways depending on the region. The amount of detail is determined by the sources of information used to construct the map data at each zoom level. But no matter the zoom level, the amount of information is voluminous and may be generally too large for storage, in total, on mobile devices and too large for continuous download over a wireless communication network.

In operation, mapping applications typically download map data to the mobile device through a wireless communication network and in response to a user entering a location of interest and/or based on the current location of the mobile device, such as the current global positioning satellite (GPS) data or current cellular network location data for the device. A conventional technique for downloading map data is to have the mobile device communicate this location data to a remote processor on the wireless communication network, which, in response, downloads all map data to the mobile device or the map data requested for display to the user.

Map data may generally be stored in blocks known as map data tiles, where the number of map data tiles increases with zoom level. The remote processor provides a subset of the available map data tiles for a particular location or region to the mobile device for storage and display at any particular time via a map display application. By providing large numbers of map data tiles, the mobile device may buffer the map data for display to the consumer as the consumer scrolls across an area using the mapping application looking for adjacent or other mapping locations. However, the larger the number of map data tiles provided at any particular time, the longer the download time and the higher the buffer memory usage while the user is using the map display application.

Map data tiles may be downloaded and cached in an inefficient manner that may not take advantage of a viewing context to more efficiently retrieve higher priority mapping data over lower priority data. One such viewing context relates to map data with respect to pre-fetching map data for different portions of a route. Pre-fetching data for later usage is important in mobile devices where a connection to a map database (e.g., via a map database server) may only be intermittent at best. Further, because mobile computing devices are generally more bandwidth and processor limited than, for example, a desktop computer, efficiency of retrieval and processing of map data is even more critical in mobile applications. As a result, there is a need to have more intelligent mechanisms for retrieving (e.g., downloading) and/or processing map data, in particular map data tiles, to sufficiently satisfy visual requirements of a limited computing device without wasting bandwidth and processing services.

SUMMARY

A computer-implemented method for pre-fetching map data for a mapping application includes receiving information on a route including an origin, a destination, and a set of paths connecting the origin and the destination and determining a first tile radius associated with the origin, a second tile radius associated with the destination, and a first set of map tile radii associated with a set of points along the route between the origin and the destination. The set of paths or roads may have a sequence. Each of the first tile radius, the second tile radius and the first set of tile radii correspond with a first, a second, and a third set of pre-fetch map data tiles, respectively. The first, the second, and the third set of pre-fetch map data tiles correspond with map surface areas around the origin, the destination and the route, respectively. The method accesses from a map database, the first, the second, and the third pre-fetch map data tiles. The map database stores the map data in the form of a plurality of map data tiles, and the first, the second, and the third pre-fetch map data tiles comprise a subset of the plurality of map data tiles. The method further stores the pre-fetch map data tiles in a local memory on a client device.

A computer device may comprise a communications network interface, one or more processors, one or more memories coupled to the one or more processors, and a display device coupled to the one or more processors. The one or more memories may include computer executable instructions stored therein that, when executed by the one or more processors, cause the one or more processors to receive, via a computer programming application, information on a route including an origin, a destination, and a set of paths connecting the origin and the destination. The instructions may further cause a processor to determine a first set of map tile radii associated with a set of points along the route including the origin and the destination, wherein first set of map tile radii define a first set of pre-fetch map data tiles corresponding to map surface areas around and including the route. The instructions may still further cause a processor to access, from a map database, the first set of pre-fetch map data tiles corresponding to the route. The map database may store the map data as a plurality of map data tiles, and the first set of pre-fetch map data tiles may comprise a subset of the plurality of map data tiles. The instructions may then cause a processor to store the first set of pre-fetch map data tiles in a local memory on a client device.

A further computer device may comprise a communications network interface, one or more processors, one or more memories coupled to the one or more processors, and a display device coupled to the one or more processors. The one or more memories may include computer executable instructions stored therein that, when executed by the one or more processors, cause the one or more processors to receive, via a computer programming application, information on a route including an origin, a destination, and a set of paths connecting the origin and the destination. The instructions may further cause a processor to determine a first, second and third set of pre-fetch map data tiles. The first set may correspond to map surface areas around and including the origin. The second set of pre-fetch map data tiles may correspond to map surface areas around and including the destination. The third set of pre-fetch map data tiles may correspond to map surface areas around the route between the origin and the destination. The instructions may still further cause a processor to access, from a map database, the first set, the second set, and the third set of pre-fetch map data tiles corresponding to the route, wherein the map database stores the map data as a plurality of map data tiles, and the first set of pre-fetch map data tiles comprise a subset of the plurality of map data tiles. Finally, the instructions may cause a processor to store the first set, the second set, and the third set of pre-fetch map data tiles in a local memory on a client device.

DETAILED DESCRIPTION

The present application generally relates to pre-fetching map data from a map database. Pre-fetching map data may refer to access/retrieval of map data by an application or device before the map data is immediately required for use. In one embodiment, map data may be pre-fetched before an initiation of a function that uses the pre-fetched data. For example, map data from a map database may be accessed and/or retrieved by a computing device before a user activates or executes a function (e.g., a display or rendering function) to use that map data. A benefit of pre-fetching the map data is that during periods in which a map database is unavailable (e.g., when a mobile computing device is offline), the pre-fetched map data may be available to a mapping application or computing device to provide some services or functions, such as displaying a pre-fetched route. Generally, a route includes two endpoints (e.g., origin and destination) and a set of paths or roads connecting the two endpoints. The set of paths or roads may have a sequence. The sequence may also correspond to a direction of travel. Routes and route types are described in more detail below.

More specifically, the present application describes techniques for fetching map data as a selected subset of entire map data available, by selecting map data tiles corresponding to an area that encompasses a route. An amount of map data accessed may be adjusted based on a priority of points along the route. In an example implementation, greater amounts of map data may be fetched or retrieved for endpoints of the route (representing origin and destination locations) than for points in the middle of the route. For determining what map data corresponds to an area about the route, a set of map tile radii may be used to designate map data tiles to be accessed that correspond to areas of a map surface along the route.

Figure 1:
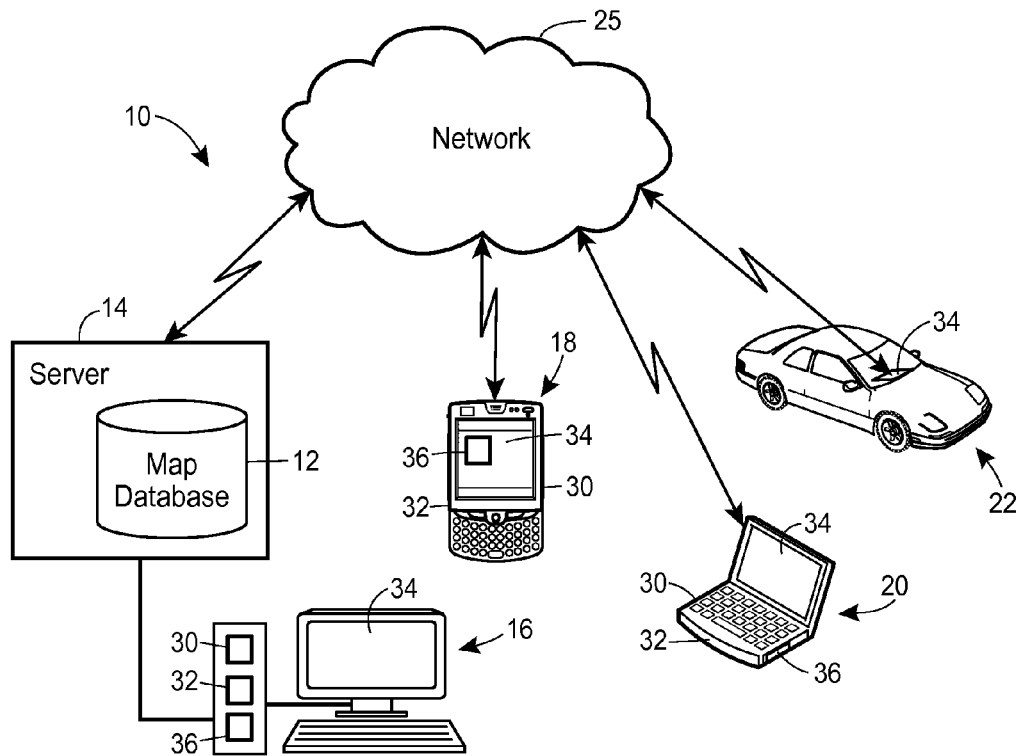
FIG. 1 is a high-level block diagram of a map imaging system that implements communications between a map database stored in a server and one or more map image rendering devices.

Referring now to FIG. 1, a map-related imaging system 10, according to an embodiment, may include a map database 12 stored in a server 14 or in multiple servers located at, for example, a central site or at various different spaced apart sites, and also may include multiple map client devices 16, 18, 20, and 22, each of which may be configured to store and implement a map rendering device or a map rendering engine. The map client devices 16-22 may be connected to the server 14 via any hardwired or wireless communication network 25, including for example a hardwired or wireless local area network (LAN), metropolitan area network (MAN) or wide area network (WAN), the Internet, or any combination thereof. The map client devices 16-22 may be, for example, mobile phone devices (18), computers such a laptop, tablet, desktop or other suitable types of computers (16, 20) or components of other imaging systems such components of automobile navigation systems (22), etc. Moreover, the client devices 16-22 may be communicatively connected to the server 14 via any suitable communication system, such as any publically available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. However, the image rendering systems described herein may be, in some embodiments, optimized for use with vector image data which may define or include a series of vertices or vertex data points for each of numerous sets of image objects, elements or primitives within an image to be displayed. Generally speaking, each of the image objects defined by the vector data may have a plurality of vertices associated therewith and these vertices may be used to display a map related image object to a user via one or more of the client devices 16-22.

As will also be understood, each of the client devices 16-22 may include an image rendering engine having one or more processors 30, one or more memories 32, a display device 34, and in many cases a rasterizer or graphics card 36 which may be generally programmed and interconnected in known manners to implement or to render graphics (images) on the associated display device 34. The display device 34 for any particular client devices 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 may operate such that a user, at one of the client devices 16-22, may open or execute a map application (not shown in FIG. 1) that operates to communicate with and to obtain map information or map related data from the map database 12 via the server 14, and that may then display or render a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 may download map data in the form of vector data from the map database 12 and may process that vector data using one or more image shaders to render an image on the associated display device 34.

Figure 2:
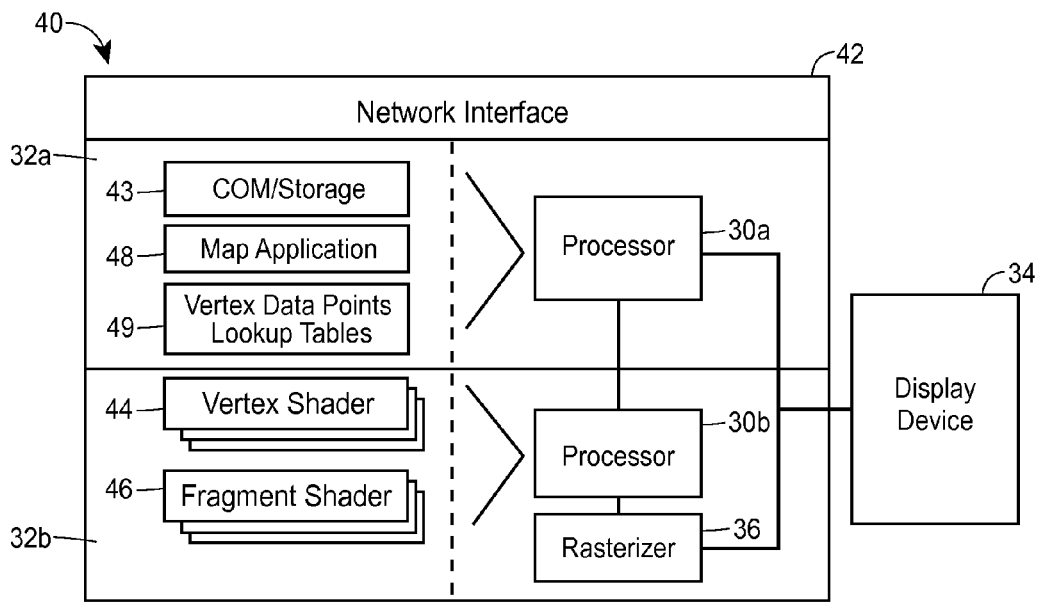
FIG. 2 is a high level block diagram of an image rendering engine used to render map images using map vector data.

Referring now to FIG. 2, an image generation or imaging rendering device 40 associated with or implemented by one of the client devices 16-22 is illustrated in more detail. The image rendering system 40 of FIG. 2 may include two processors 30a and 30b, two memories 32a and 32b, a user interface 34 and a rasterizer 36. In this case, the processor 30b, the memory 32b and the rasterizer 36 may be disposed on a separate graphics card (denoted below the horizontal line), although this need not be the case in all embodiments. For example, in other embodiments, a single processor may be used instead. In addition, the image rendering system 40 may include a network interface 42, a communications and storage routine 43 and one more map applications 48 having map display logic therein stored on the memory 32a, which may be executed on the processor 30a. Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders may be executed on the processors 30a and 30b to provide the functionality described below. The network interface 42 may include any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 may also include a data memory 49, which may be a buffer or volatile memory for example, that stores vector data received from the map database 12, the vector data including any number of vertex data points and one or more lookup tables as will be described in more detail.

During operation, the map logic of the map application 48 may execute on the processor 30 to determine the particular image data needed for display to a user via the display device 34 using, for example, user input, GPS signals, prestored logic or programming, etc. The display or map logic of the application 48 may interact with the map database 12, using the communications routine 43, by communicating with the server 14 through the network interface 42 to obtain map data, preferably in the form of vector data or compressed vector data from the map database 12. This vector data may be returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30a. In one embodiment, the image data sent from the server 14 may include vector data generally defining data for each of a set of vertices associated with a number of different image elements or image objects to be displayed on the screen 34 and possibly one or more lookup tables. If desired, the lookup tables may be sent in, or may be decoded to be in, or may be generated by the map application 48 to be in the form of vector texture maps which are known types of data files typically defining a particular texture or color field (pixel values) to be displayed as part of an image created using vector graphics. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables downloaded and stored in the data memory 43.

Figure 3:
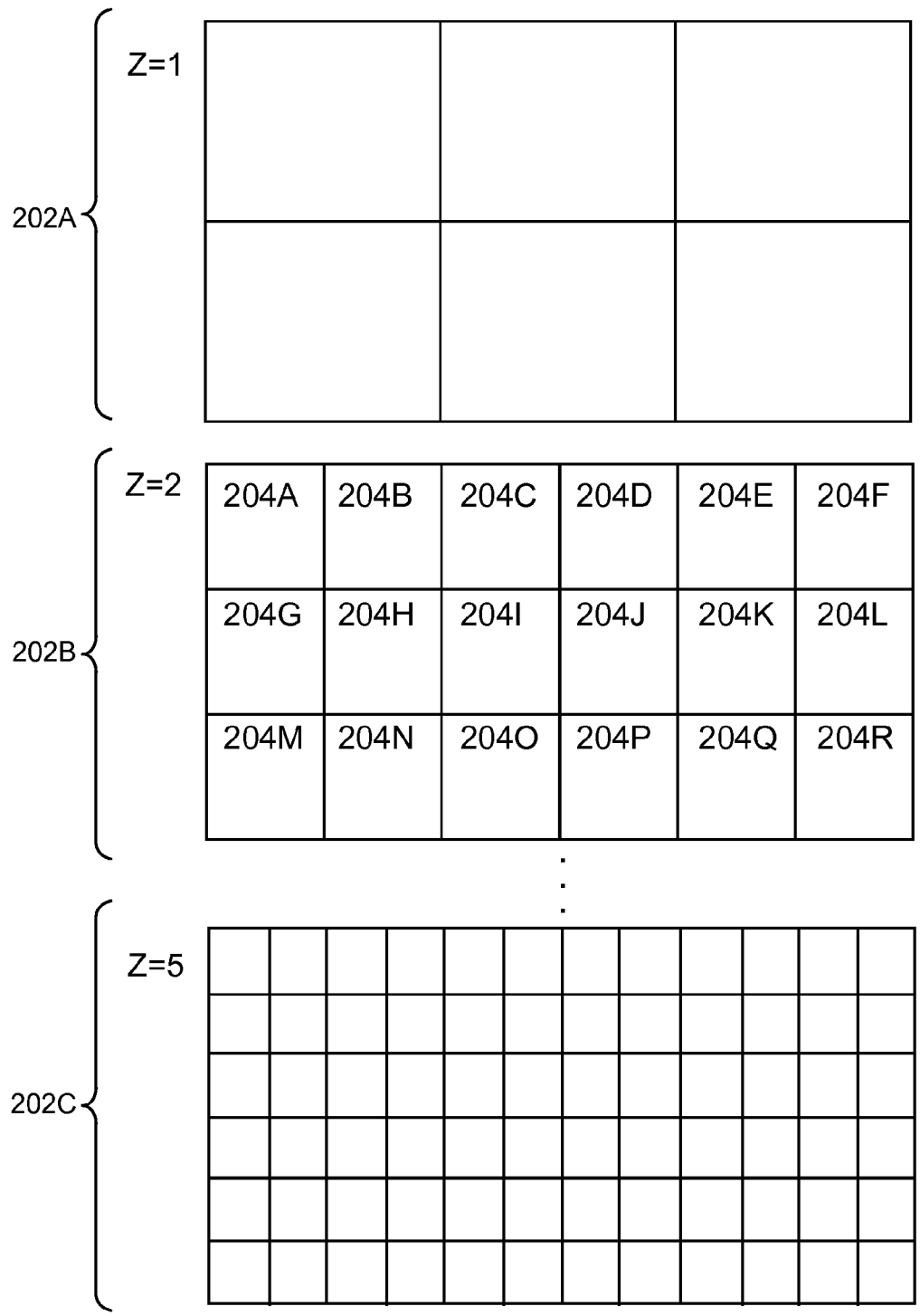
FIG. 3 illustrates a portion of a data structure that can be used in the map database of FIG. 1.

Generally speaking, map data in the map database 12 for a particular geographic region may be stored in different zoom levels, where each zoom level is formed of a plurality of map data blocks, termed map data tiles, which may be used, in one embodiment, to construct a visual display of the map or surface of the map at different levels of detail. FIG. 3 illustrates an example data structure 200 of a portion of the map database 12. The map data for a particular geographic region may be stored in numerous (n) different zoom level data structures (only three of which are shown) 202A, 202B, and 202C, where each data structure is formed by a plurality of map data tiles. The data structure 202B, which is the only one numbered for explanation purposes, shows the map data for the particular or fixed geographic region at zoom level, z=2, which is formed of 18 map data tiles, 204A-204R. The map data tiles may represent the basic building blocks for constructing a map display. Each map data tile may contain necessary map data to construct a portion of the map display (e.g., a map surface), including data identifying various map objects or map features such as roads, buildings, and geographic boundaries, such as water lines, county lines, city boundaries, state lines, mountains, parks, etc. The map data for a geographic region may be stored in any number of different zoom level data structures to provide different levels of detail for the particular geographic region. In an embodiment, nineteen total zoom levels may be stored in the map database 12.

The number of tiles for a fixed geographic region at each zoom level may increase, e.g., linearly, quadratically, exponentially, or otherwise as the zoom level number increases. The zoom levels in the illustrated example (z=1, 2, and 5) have 6, 18, and 60 map data tiles, respectively, covering the same geographic area or region. Because the number of map data tiles may increase for the same area as zoom level increases, zoom level may be considered a density of map data corresponding to a number of tiles per unit area. Higher zoom levels may generally require more tiles per unit area and thus provide higher map data density over lower zoom levels.

In the illustrated embodiment, all map data is stored in map data tiles, and each map data tile in a zoom level data structure may be allocated the same or similar memory allocation size. For example, each tile 204A-204R may be a bitmap image 10 Kbytes in size. This may be achieved, for example, by having each map data tile cover the same sized geographic area. For map data tiles containing vector data, the data size for each tile may vary, but each tile may still, in some embodiments, be allotted the same maximum memory space. Although not illustrated, in other embodiments, the data tiles may have different memory space allocations within each zoom level data structure. In some embodiments, each map data tile may contain map data stored in a bitmap format while in other embodiments each map data tile may contain map data stored in vector format.

Figure 4A:
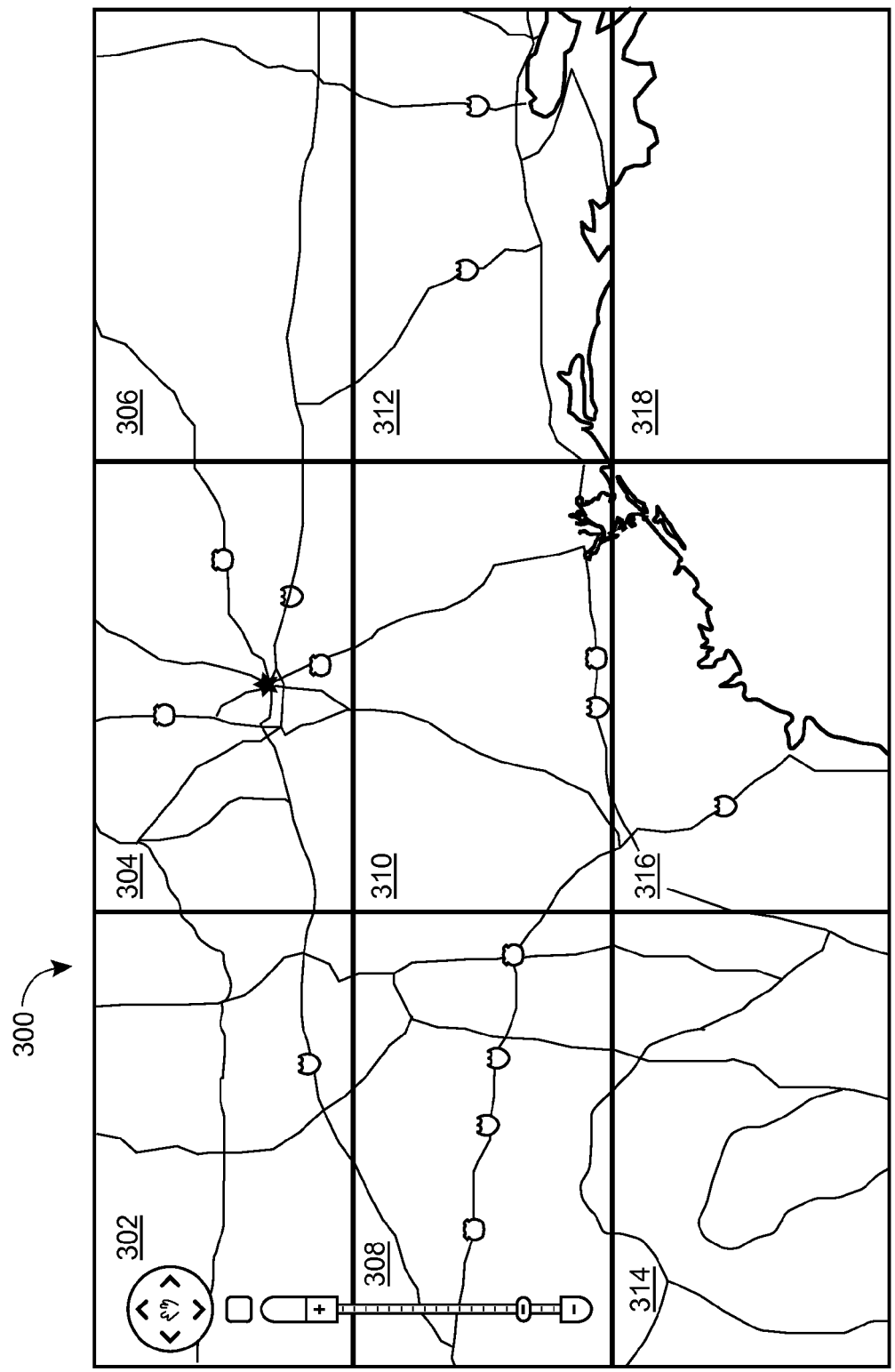
FIGS. 4A, 4B, and 4C illustrate example renditions of map data at three different zoom levels, respectively.
Figure 4B:
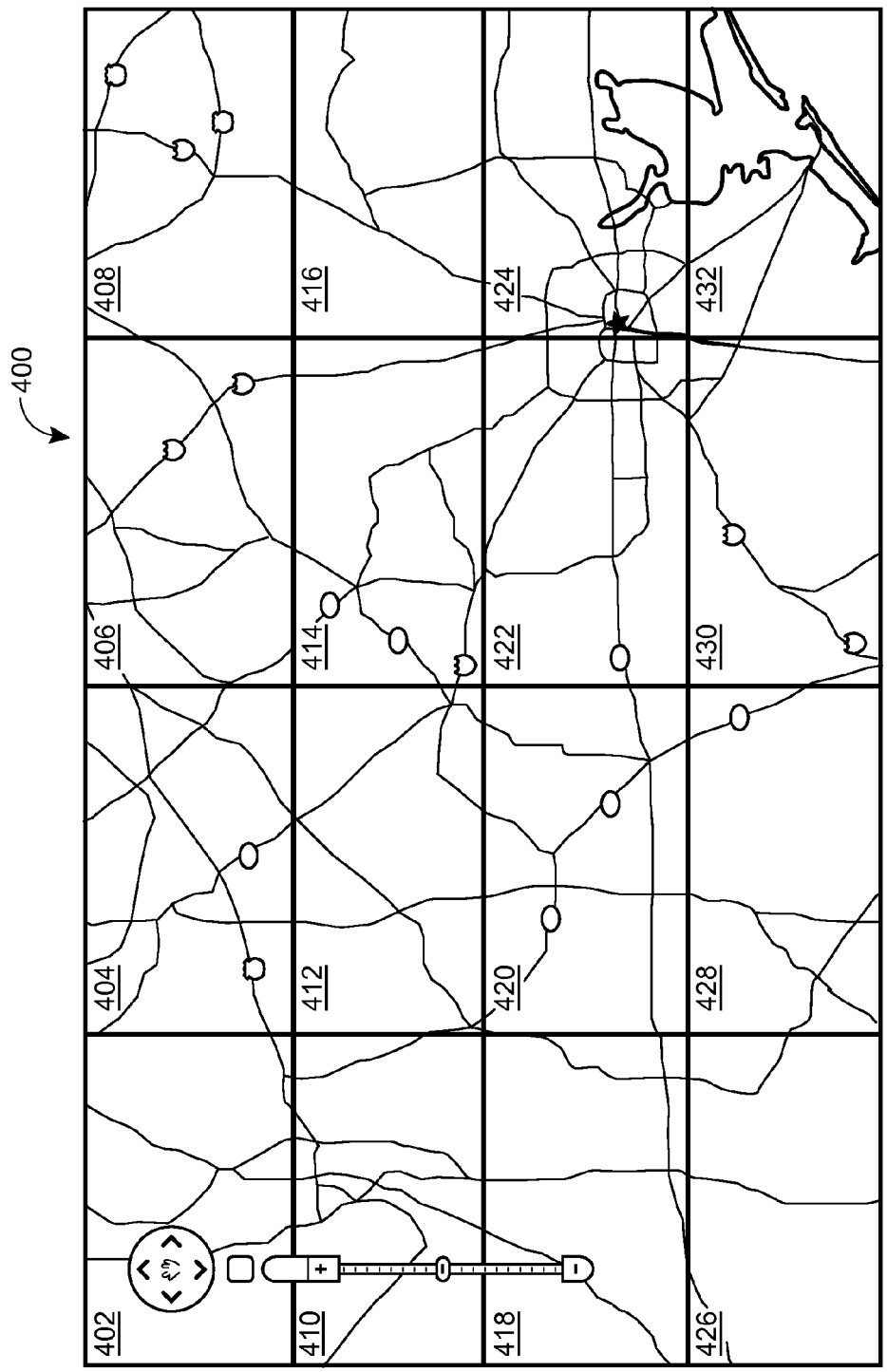
Figure 4C:
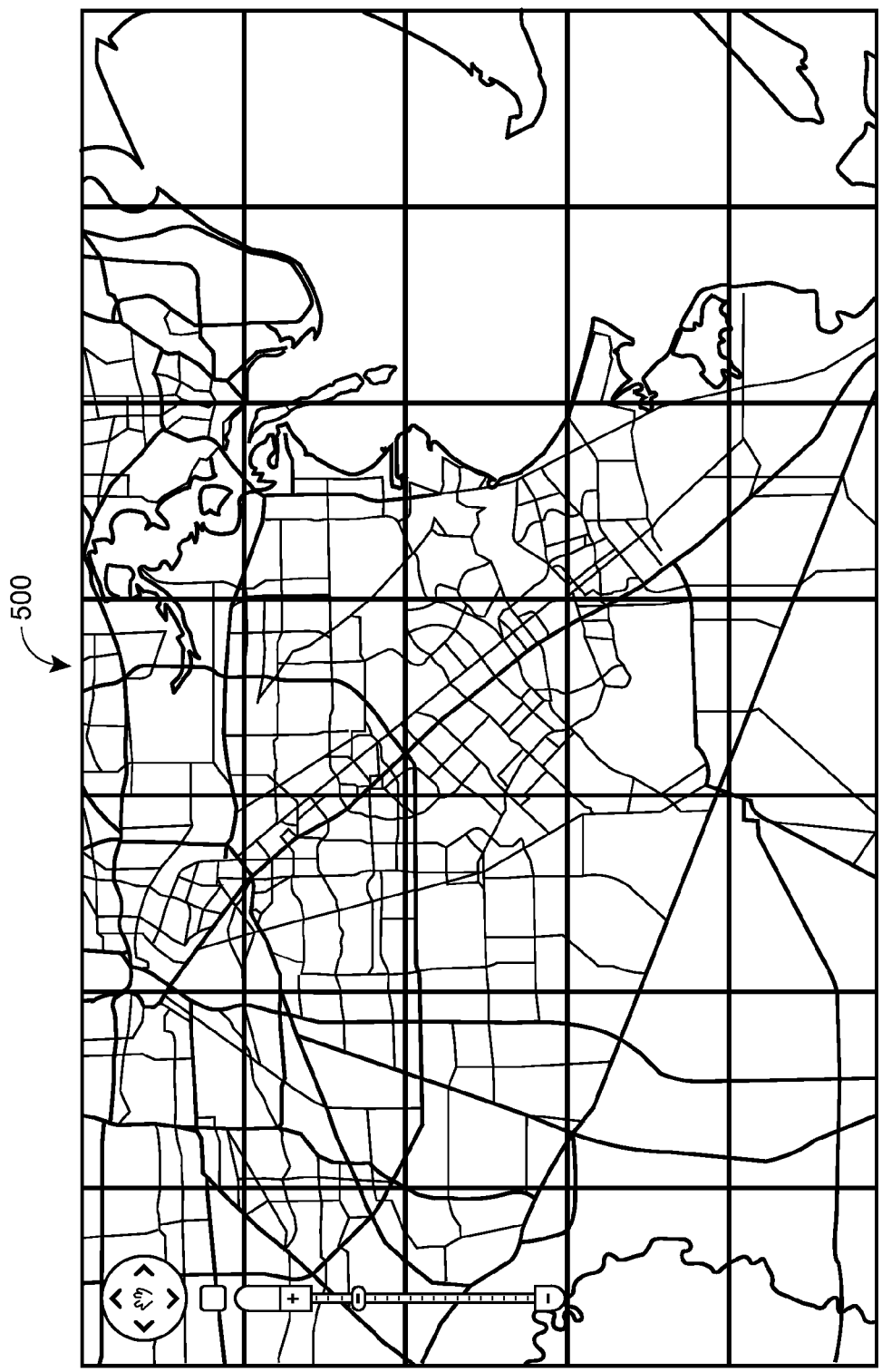

FIGS. 4A-4C illustrate visual map displays, e.g., that may be fully or partially displayed on the user interface 34, where each figure may provide a visual display of a map surface at a different zoom level. In the illustrated embodiments, FIG. 4A provides a visual map display 300 at an example zoom level, z=6, constructed of a series of map data tiles 302-318, which cover the same size geographic area and which have the same amount of memory size.

In operation, the server 14 may be configured to transmit map data to respective client devices 16-22 in chunks of data defined by these map data tiles. For example, to transmit the map data needed to construct the map display 300, the server 14 may transmit each map data tile in a frame, having a header portion providing identification data of the frame (such as geographic position, client device address, map data tile version number, etc.) and a payload portion containing the specific map data tile data to be used in forming the visual display. Map data tiles may provide an effective mechanism for quantizing map data stored in the map database 12 and for quantizing communication of the map data over the network 25 to the client devices 16-22.

In comparison to FIG. 4A, FIG. 4B illustrates a visual map display 400 at a zoom level higher than the zoom level of FIG. 4A, in this example zoom level, z=10. The map display 400 may be formed of a plurality of map data tiles 402-432. Like the map data tiles 302-318, the map data tiles 402-432 are each the same in size, e.g., covering the same size of a geographic area and having the same memory size. FIG. 4C illustrates another visual map display 480 at a third even higher zoom level, zoom level z=12, formed of map data tiles.

Each of the displays 300, 400, and 480 may illustrate a portion of the overall map data, which comprises many more map data tiles. As illustrated across FIGS. 4A-4C, the map data tiles that form each visual map display may have various levels of detail. The tiles 302-318 may illustrate geographic boundaries, but no roads, only highways and/or interstates, while the tiles of FIG. 4C may be at a higher zoom level and contain information on roads, buildings, parks, end points, etc.

While a user interacts with the visual map displays 300, 400, and 480, the user may wish to scroll around to display other map data (corresponding to different geographic areas) near the illustrated map data. Therefore, the client devices 16-22 may use a system to fetch and store a sufficient amount of map data to form the visual map display while buffering additional map data at one of the local client devices 16-22 to allow efficient user interaction with that display.

Figure 5:
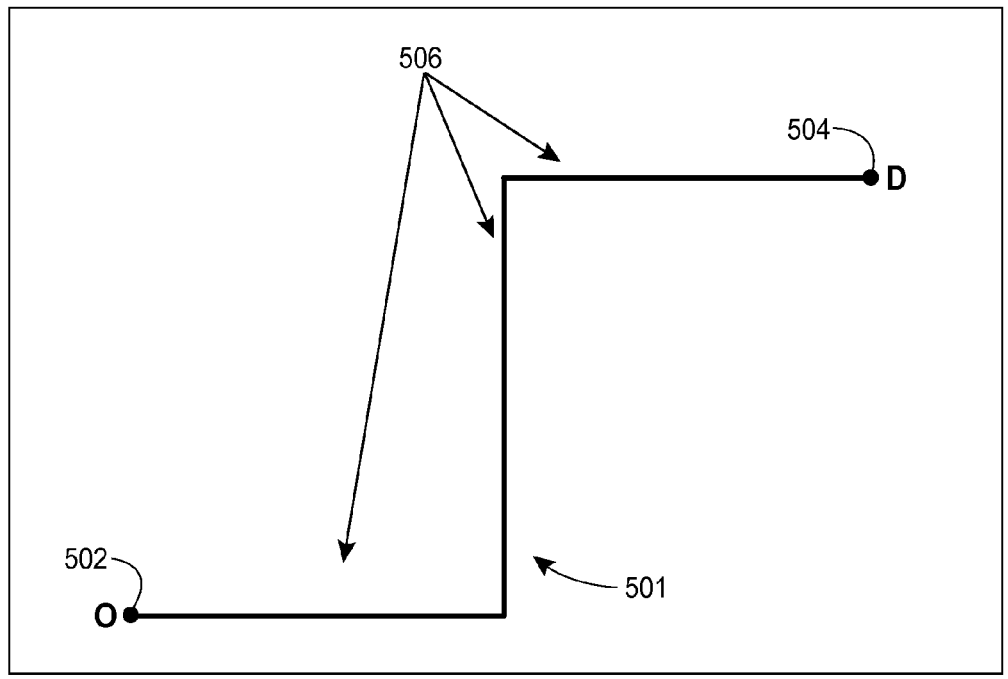
FIG. 5 illustrates a viewing window displaying a route.

FIG. 5 illustrates a viewing window 500 of a route 501. The route may be projected on to a map surface or map area. Generally, the route 501 may comprise an origin 502, a destination 504, and a set of roads, streets, paths, segments etc. 506 that together connect the origin 502 to the destination 504. A set, as used herein, includes one or more elements. The set of roads may be ordered as a sequence of roads. The route 501 may have a direction which may also be indicated by the sequence of the set of roads. The route 501 may be determined in a number of manners. For example, a user may specify an origin and a destination (e.g., the user may input two addresses) and a mapping application may determine, using data from a mapping database, a set of streets that may connect the two points or locations, thereby forming a route. In some instances, the mapping application may determine a plurality of routes connecting the origin and destination, where a user may be given an option to select or designate at least one of the possible routes for processing. Alternatively the user may provide the mapping application with a route including an origin, a destination, and a collection of paths (e.g., roads) connecting the origin and destination.

In an embodiment of the techniques described herein, a map database, such as map database 12, may be accessed to pre-fetch or retrieve map data (e.g., map data tiles) corresponding to a map area that encompasses a determined route. In another embodiment, map data may be pre-fetched to generate one or more routes. The map data used to generate a route may be contained in the same map data tiles used to provide information for displaying a route. In a different embodiment, the data used to generate the route may be contained in map data tiles separate from the map data tiles used to render the route. In another embodiment, the data used to generate the route may be contained in a data form different from map data tiles. Pre-fetching generally involves initiating a retrieval of map data before that data is needed for processing. For example, pre-fetching may involve retrieving map data before an initiation of a rendering or display function utilizing that map data. Pre-fetching may also involve storing map data in a local memory for faster retrieval over a map database. For example, the speed of accessing a local memory may be faster than the speed of accessing a map database (e.g., due to intermittent connection, connection bandwidth, etc.). In situations where a mobile device is only able to intermittently access the server 14 over network 25, pre-fetching may involve scheduling access and retrieval of map data whenever the client device is able to connect to the server 14, whether or not the mobile device/user has even requested access to that data (e.g., via a request or function to render map data corresponding to the pre-fetched data).

Figure 6:
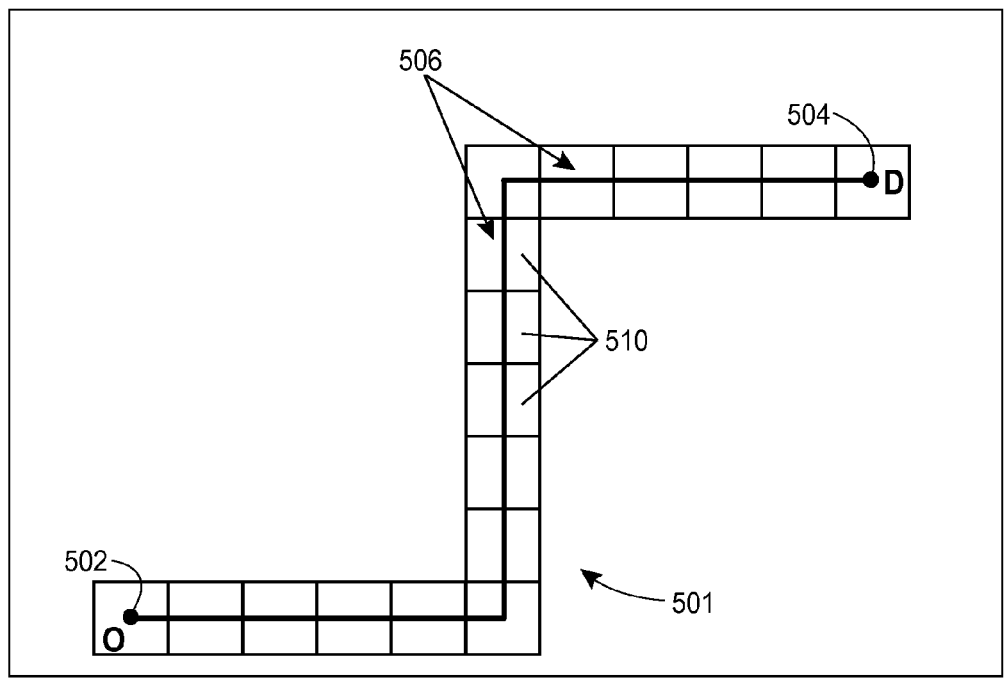
FIG. 6 illustrates a route showing discrete areas around the route corresponding to map data tiles.

FIG. 6 illustrates the route 501 of FIG. 5 with square areas 510 disposed around the route. It should be noted that the term "around" when used with reference to a location or point is meant to include the location or point. Thus, "around the destination" includes an area adjacent to the destination as well as the destination point itself. The squares 510 may represent discrete areas of the map corresponding to discrete units of map data. With respect to map data tiles described above, each square area 510 may represent or correspond with a map data tile for particular zoom level. The areas 510 may represent only a subset of a total set of map data tiles available or retrievable. For example, where map data tiles may generally exist for the entire viewing window 600, the map data tiles represented by areas 510 are only a fraction of the total map data tiles for the viewing window.

FIG. 6 illustrates that at a particular zoom level, a minimum amount of map data for displaying a route may include at least a set of map data tiles that correspond to an area that encompasses every point on the route. In one embodiment, a minimum amount of map data may be pre-fetched or retrieved for a route by accessing via a map database the map data tiles corresponding to squares 510 of FIG. 6. For example, one of the devices of system 10 may include instructions that, upon execution by a processor, determine whether a point on a route is included within a map data tile and determine or identify the map data tiles that comprise the minimum number of map data tiles that encompass the route.

Figure 7:
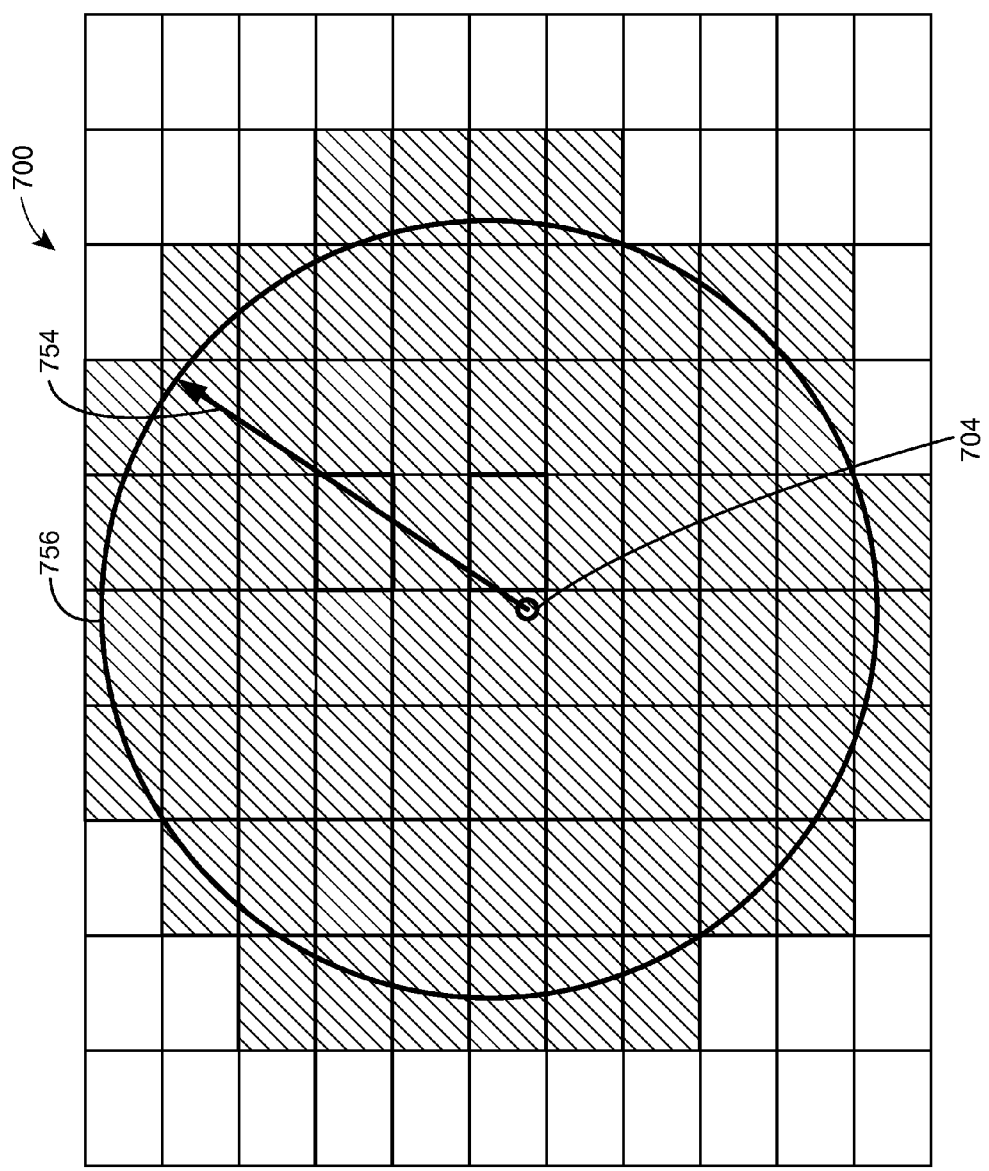
FIG. 7 illustrates map data tiles including identified pre-fetch map data tiles corresponding to a map tile radius.

A greater area around the route may be desired for some rendering situations of a mapping application. Generally, the method and system may determine a subset of map data tiles for an area encompassing the route (e.g., the route of FIGS. 5-9) by determining a tile radius of points along the route, including an origin and a destination. FIG. 7 illustrates an example visual map display 700 showing a portion of available map data stored in the map database 12, at a first (arbitrary) zoom level. A point of interest 704 is shown with an assigned map tile radius 754. The map tile radius 754 represents a radial distance from the point of interest 704 for identifying tiles to fetch from the map database 12. The tile radius 754, in FIG. 7, extends from the point of interest 704 to identify a plurality of map data tiles associated with the point of interest that are disposed within a circumference region 756 defined by the identified tile radius, R. In the illustrated embodiment, this region 756 defines the set of pre-fetch map data tiles that are to be identified, for example, from the map database 12 and sent to one of the client devices 16-22. In one example, any map data tile overlapping even partially with the circumference region 756 will be within the set of pre-fetch map data tiles. These tiles are shaded in FIG. 7.

Figure 8:
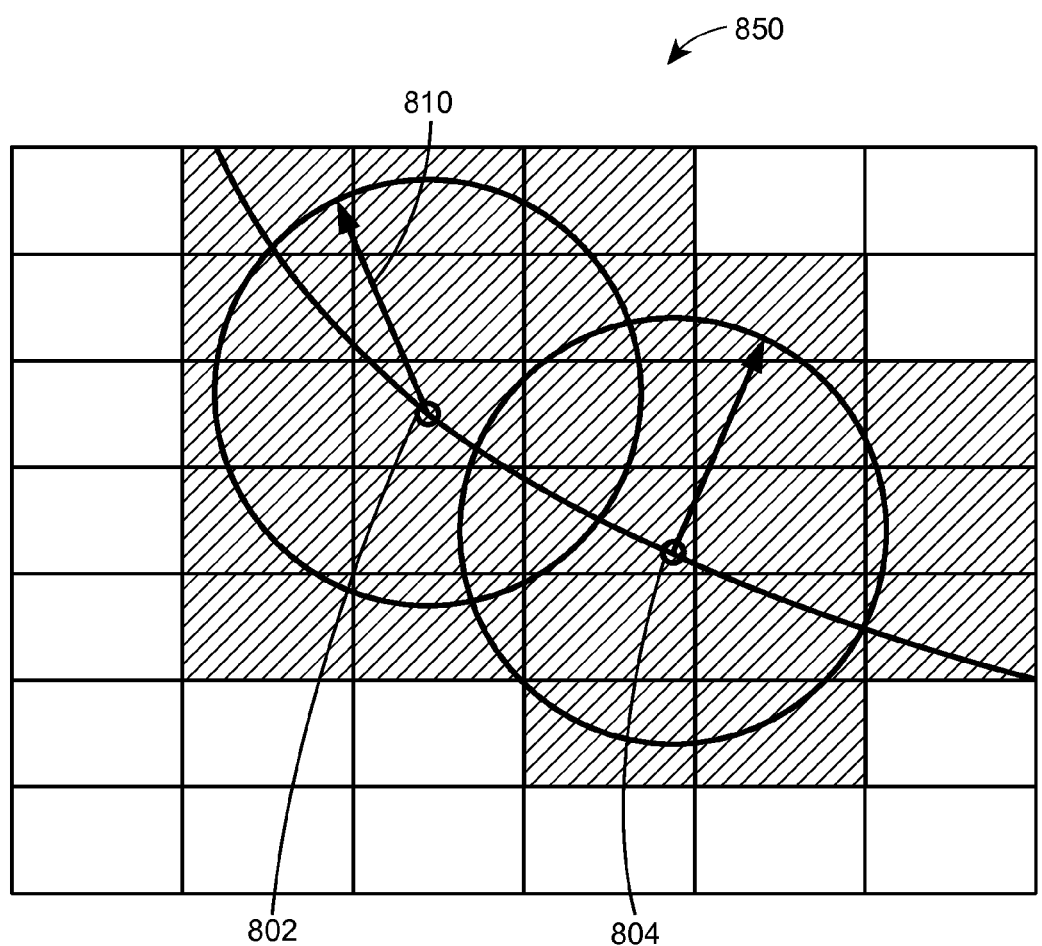
FIG. 8 illustrates two points 802, 804 along a route segment 810 (e.g., a road segment) with corresponding tile radii 810.

FIG. 8 illustrates two points 802, 804 along a route segment 810 (e.g., a road segment) with corresponding tile radii 810. The shaded area of FIG. 8 illustrates map data tiles that may be retrieved for the route segment 810 based on the radii 802, 804. In FIG. 8, only a few points (e.g., points that are spaced apart by a constant interval) along the road may be used to determine map radii and the corresponding shaded area may be retrieved. In other embodiments, more points may be used to define map tile radii for a line segment. Moreover, while a line segment, such as a road segment, may comprise an infinite number of points, map tile requests do not necessarily require a great number of requests or identifications for data tiles. Instead, a shaded area of interest may be calculated (using an integral function, for example) for the entire length of the line segment and a single calculation may be made to identify all tiles within a radius of the route. A single call may then be made to retrieve all the corresponding map data tiles (e.g., at one time).

Figure 9:
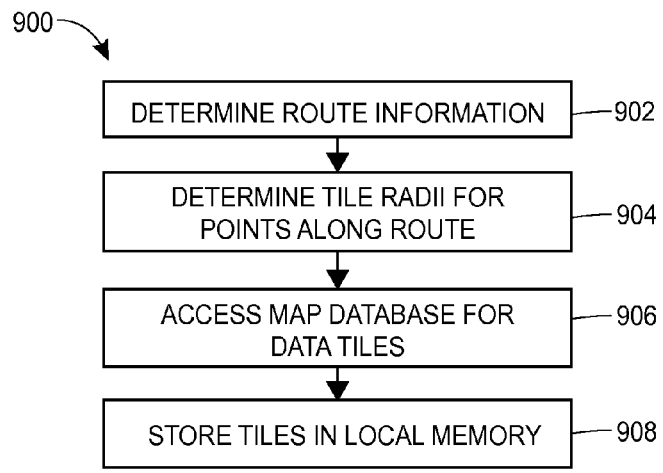
FIG. 9 illustrates a process flow for determining pre-fetch map data tiles using tile radii.

FIG. 9 illustrates a process flow diagram or flow chart of a method, routine, or process 900 that may be used to pre-fetch map data for a map surface such as that illustrated in FIGS. 5-6. The method 900 may include one or more blocks, modules, functions or routines in the form of computer-executable instructions that are stored in a tangible computer-readable medium and executed using a processor of the server 14 or client devices 16-22. The method 900 may be included as a module or component of any backend device (e.g., the server 14) or frontend device (e.g., the client devices 16-22) of a computing environment for the system described herein, or as part of a module that is external to such a system. FIG. 9 will be described with reference to the Figures for ease of explanation, but the method 900 can of course be utilized with other objects and user interfaces. In any event, a block 902 determines route information including information on an origin, a destination, and a set of roads connecting the origin and destination. This may be received in response to one or more instructions executing within a mapping application on one of the client devices 16-22. The block 902 may also pre-fetch map data used to generate a route. As discussed, this map data for generating a route may take the form of map data tiles which may be different or same as the map data tiles for rendering a route or may be stored as a separate data form altogether. In one embodiment, the map data for generating a route may be in the form of turn-by-turn instructions that define a route.

A block 904 may determine a set of map tile radii for points along the route. In one embodiment, block 904 may determine a minimum tile radius for all points along the route. The minimum map tile radius may be selected to enable a minimum number of map data tiles to be selected that corresponds with an area that encompasses the entire route (such as that of FIG. 6). This minimum map tile radius may be considered a fixed radius for the entire route. In other embodiments, block 904 may also determine a set of map tile radii for points of interest or points of priority along the route. These points of interest may be determined to have radii larger than the minimum tile radius (to be discussed further below). Once the radii are determined for the route, a block 906 may access a map database, such as map database 12, for the map data tiles corresponding to the radii determined in block 904. A block 908 may then retrieve the map data tiles corresponding to the radii determined in block 904 and store the retrieved tiles in a local memory of a client device 16-22.

In one embodiment, a point along a route may be assigned a priority value. For example, priority may be assigned or designated using a flag, an attribute, or other indicator associated with a point on the route. A route segment may be defined by a set of points, and thus, the route segment (e.g., a road segment of the route) may correspond to a priority when a set of points defining the route segment are assigned that priority. Further, a priority attribute may simply be a high or a low value (i.e., priority or no priority). In other embodiments, the priority may be a scaled value between a high and a low value.

The method and system described herein may determine one or more points of interest to display to a user via the interface 34. The points of interest may be determined based on a user input, for example, through the user providing an address into a data field presented on the interface 34, or through the user selecting to find a point of interest obtained through interaction with the interface 34. Generally, the priority of a point along the route may represent or may be determined by a likelihood that a user may initiate a function that accesses map data corresponding to the point. This may correspond to a user initiating a function to display a portion of the map using particular map data. The likelihood of access may be determined based on metrics of the system in operation, including, for example, analysis of the average number and times that instructions of the mapping application are executed to access the map data.

Figure 10:
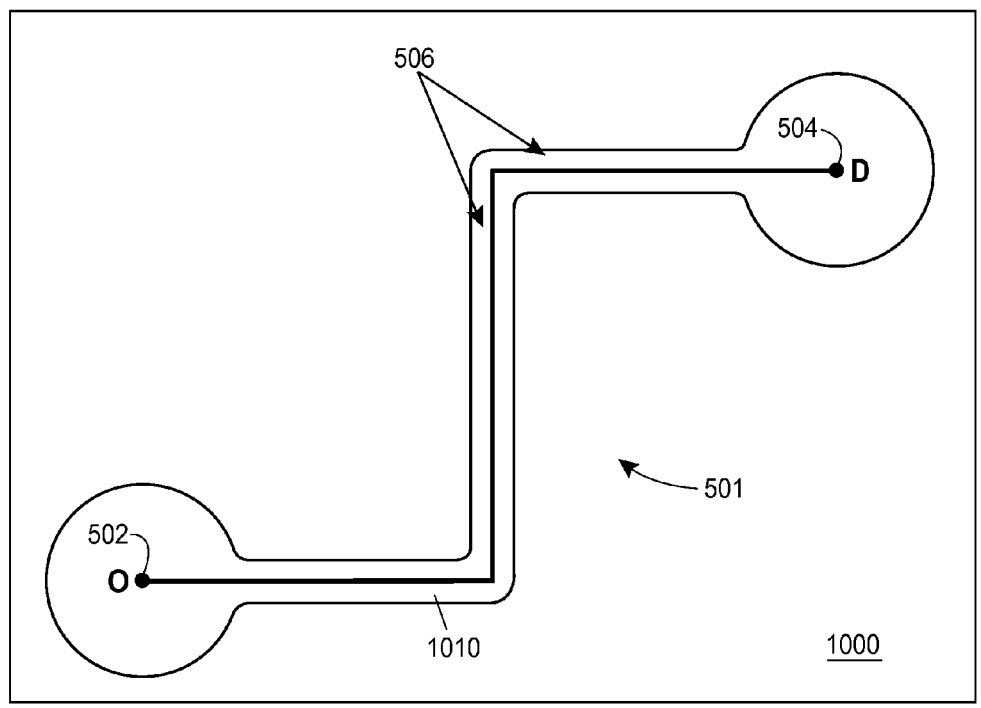
FIG. 10 illustrates an area corresponding to map data that encompasses a determined route.

In one embodiment, the origin and destination may be assigned by default as points of interest having a high priority. FIG. 10 illustrates an area 1000 that encompasses the determined route 501 (FIG. 5) where there is map data corresponding to a greater area around the origin 502 and destination 504 than along the route 506 connecting the origin 502 and destination 504. FIG. 10 illustrates that the origin 502 and destination 504 may be assigned a higher priority than a set of points along the route 506 between the origin and destination. In this case, larger map tile radii are assigned to the origin 502 and destination 504. The origin and destination may represent default points of interest. In this case, a greater amount of data is retrieved for the high priority points (origin and destination) than for the lower priority points of the connecting route.

In some embodiments, the destination 504 may have higher priority, and thus more map data corresponding to a greater area, than the origin 502. This may apply to situations when a user intends to travel to the destination and is more likely to require more information at the destination (potentially longer stay time) than at an origin (potentially less stay time since the user may be leaving). There are some situations, however, where the origin may require a greater amount of priority and may have a greater map area. This may be the case, for example, when the complexity of the area about the origin (e.g., complexity increases as the number of junctions, roads, and terrain complexities increases) is high and a greater amount of map area is needed for navigating through the area about the origin.

Figure 11A:
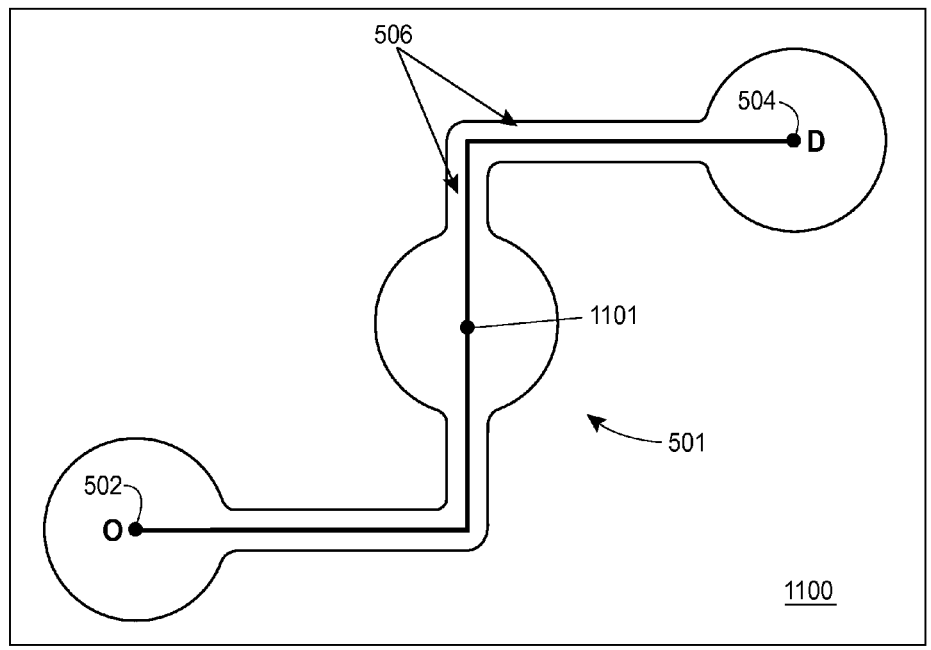
FIG. 11A illustrates a map display of a route that has a special point of interest on the route between an origin and a destination.

FIG. 11A illustrates a viewing window 1100 of a map surface showing multiple points of interest 502, 504, and 1101. FIG. 11A illustrates a special point of interest 1101 on the route 501 between the origin 502 and the destination 504. In this situation, the point of interest 1101 may be assigned a higher priority, and a larger tile radius, than the surrounding route. This point of interest may be a city, a town, or other landmark that has been assigned a high priority. A plurality of points of interest along the route may be assigned a high priority and greater amounts of map data tiles may be retrieved for those points of interest.

Figure 11B:
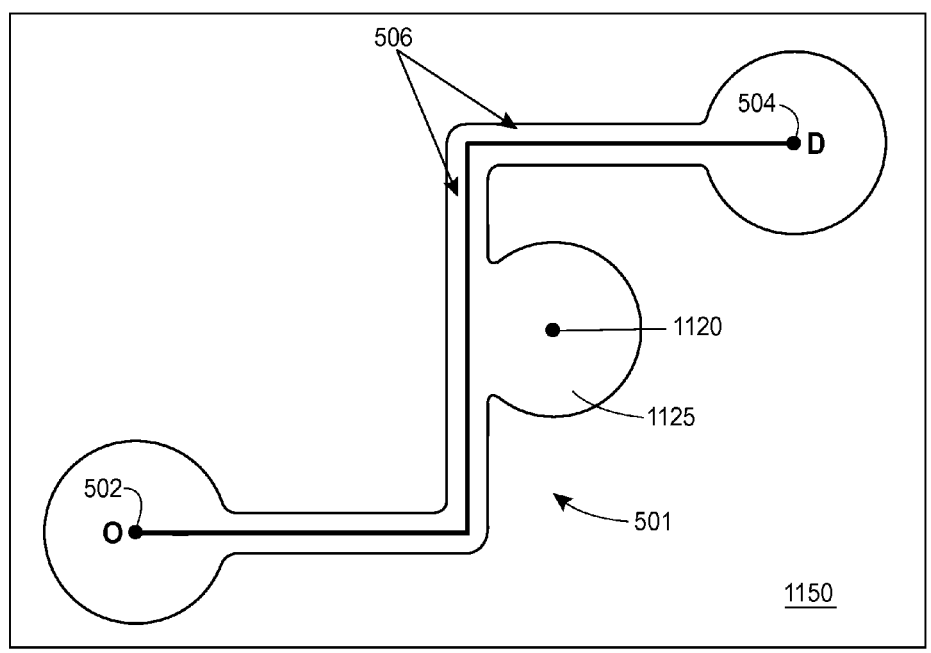
FIG. 11B illustrates a map display of a route having a point of interest offset from the route.

FIG. 11B illustrates a viewing window 1150 of the route 501 that has a special point of interest 1120 located a distance offset from the route 501 between the origin 502 and the destination 504. In this situation, an area 1125 around the point 1120 may be designated and corresponding map data tiles marked for the area 1125. In one embodiment, a tile radius for the point of interest 1120 may be determined so that a circumference of the tile radius overlaps with a tile radius of a point along the route 501 closest to the point of interest 1120. This may be convenient for points of interest that are located near the route 501. In another embodiment, the method and system may determine one or more paths from a point along the route to the point of interest 1120 that is outside the route. Whether or not a path is determined for the point of interest 1120 may depend on a distance between the point of interest 1120 and the path 501. For example, a path may be determined for a route to an off-route point of interest 1120 when a distance to the point is at or below a threshold distance to account for a greater likelihood that a user will travel a shorter off-route distance to go to the point 1120 than a longer off-route distance.

Priority of points along the route may be determined based on user input, for example, through the user providing an address into a data field presented on the interface 34, or through the user selecting to find a point of interest obtained through interaction with the interface 34, more generally. For example, the user can access a web-browser or other program running on the client device that identifies a location, business, home, etc., from which one of the client devices 16-22 may allow the user to select such item for building a map display of the vicinity around such point of interest.

Any suitable manual method for entering or otherwise identifying one or more points of interest may be used by one of the client devices 16-22. Furthermore, a mapping application on one of the client devices 16-22 may automatically identify points of interest, for example, by determining a GPS position of the current location of one of the client devices 16-22, by determining most recently searched points of interest, by accessing a database of stored points of interest, or by determining the most recently visited points of interest (e.g., cities, neighborhoods, etc.). Of course, in some of these cases, the mapping application may determine locations for which to download map data for storage at the user device as a background application and thus without any particular user interaction.

Figure 12:
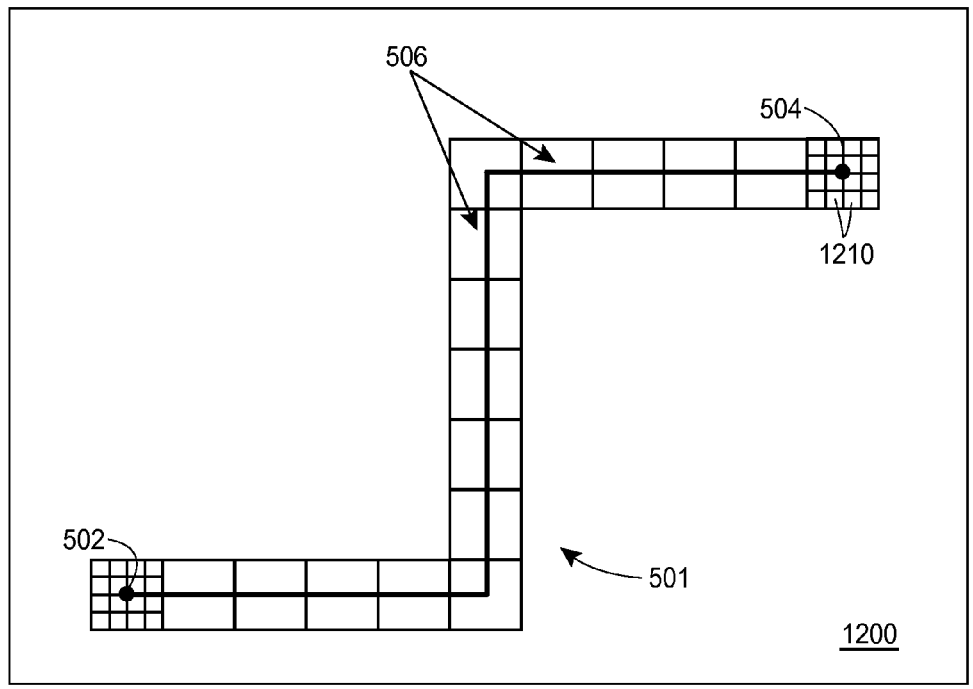
FIG. 12 illustrates map data tiles including identified pre-fetch map data tiles for two different zoom levels.

As discussed above, process blocks 906-908 may access a map database to pre-fetch larger numbers of map data tiles corresponding to larger map areas around points of interest at a single zoom level. In one embodiment, instead of or in addition to pre-fetching more map data tiles at a first single zoom level for high priority points, the method and system may pre-fetch map data tiles for high priority points at a second higher zoom level. FIG. 12 illustrates the same route of FIG. 6 having areas 506 representing the same size map data tiles as the zoom level of FIG. 6. In addition, FIG. 12 illustrates additional map data tiles represented by areas 1210 of a second higher zoom level. A user wishing to zoom into an area around the origin 502 or destination 504 may initiate a zoom function of the viewing window. When the higher zoom level map data tiles are pre-fetched to one of the client devices 16-22, a response time for rendering those map data tiles may be relatively fast.

Of course, in addition to retrieving additional map data tiles at the second higher zoom level, the method and system may also retrieve map data tiles at a second higher zoom level for a different area than that of the first zoom level or for a different area in relation to other points on the route at the second higher zoom level. Also, the method and system may or may not retrieve higher zoom level data for points along the route at low priority (e.g., in the middle of the route, without a point of interest, etc.). Whether higher zoom level map data is retrieved for points about the middle of the route may be dependent on the priority of points along the route. As discussed above, priority of a point on the route may be based in part on a determination of a likelihood of access for that map data.

The method and system described above may retrieve or process and store into a cache memory of a client device 16-22 only a subset of available or retrievable map data tiles based on determined areas encompassing a determined route. This method and system may provide a faster response time when anticipated map data is downloaded to a local cache memory for quick retrieval and processing. While one type of priority discussed above is based on designating what map data (area and/or zoom level data around a route) to retrieve, a second type of priority may be an order or sequence in which that map data is retrieved. The sequence of map data retrieval (e.g., map data tiles) may help to reduce bandwidth and processor tolls. The sequence of map data retrieval may also ensure that more important, high priority tiles are downloaded first in case a connection to a server containing the map data is lost during retrieval.

Figure 13:
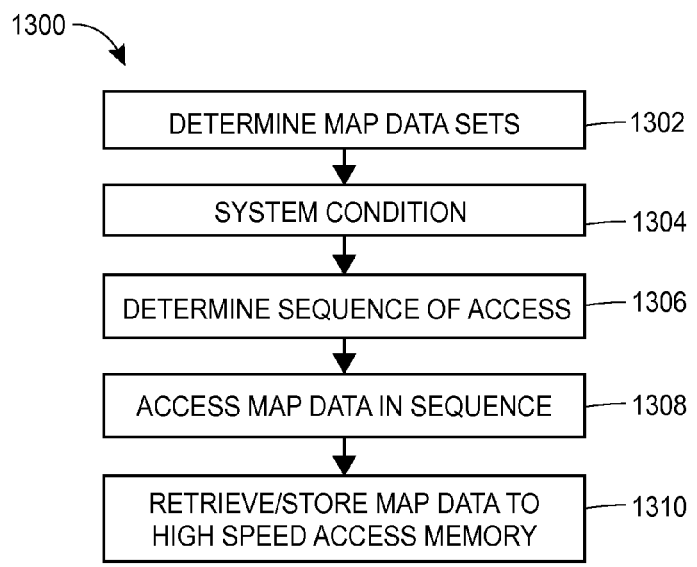
FIG. 13 illustrates a process flow for determining a sequence of access of sets of map data tiles which can be pre-fetched.

FIG. 13 illustrates a process flow for determining when and in what order to retrieve map data tiles. Block 1302 may determine sets of different map data to receive. The sets of map data may correspond to the map data determined as discussed above. For example, a first set of map data may correspond with the area around the origin, a second set of map data may correspond with the area around the destination, a third set of map data may correspond with the area along the path between the origin and destination, and a fourth set of map data may correspond to an additional point of interest. Additional sets may involve different zoom level data for portions of the route (e.g., origin, destination, road segments, and other points of interest).

A block 1304 may then determine a current condition of the system (e.g., a viewing window state, a current bandwidth, a current processor capacity, etc.). A block 1306 may then determine a sequence for pre-fetching each set of map data determined in block 1302. The determination of block 1306 may be performed based on the condition determined in block 1304. The sequence determined by block 1306 may be a fixed default sequence that is based on a likely order of access by a user. This may be the case when block 1304 indicates a default condition. At block 1308, a map database may be accessed in the sequence determined by block 1307 for each set of map data tiles of block 1302. At block 1310, the accessed map data may then be retrieved and/or stored in a local memory for quick access when a user or the map application initiates an access or processing function requiring the map data.

A general sequence may involve retrieving map data for a destination, an origin, additional points of interest along the route, and then connection segments (roads segments) to various off-route points of interest. Another sequence may lead with an overview set of map data that includes a minimum map tile data for a zoom level and viewing window position that includes the origin and destination in one displayable viewing screen (such as that of FIG. 5). Another sequence may include map data on the overview set at a first zoom level, map data of origin and destination at a higher zoom level, then map data corresponding to road segments at the first zoom level. In yet another sequence, the origin data may precede the destination data when origin is assigned a higher priority. This may be the case when an origin contains a complex traffic condition. Another case may be when additional information on a current user position (e.g., via a GPS positioning signal) places the user along a route away from the origin. In other situations, map data for points of interest along the route may have a higher priority than an origin. Of course other sequences are possible and within the scope of operation of the techniques described herein.

In one embodiment, both the sequence and area of map data tiles may be accessed or pre-fetched based on a viewing window state. In particular, the map data tiles may be accessed based on a viewing window position. The viewing window position may be centered near a particular point along the route. As the viewing window position is changed so that the center position approaches other portions of the route, either additional area map data may be retrieved (e.g., via blocks 906-908) or a sequence of retrieval may be changed (e.g., via blocks 1306-1310). This embodiment may be used in situations in which a current position of a device rendering a map is provided to center the map at that current position (e.g., using a GPS system).

The amount of map tile data and the sequence in which subsets of the map tile data are accessed may be based on a current bandwidth or processor load of the system of FIG. 1. Decisions of whether to download a greater or smaller radius of map data tiles may depend on bandwidth and/or latency considerations associated with retrieving the amount of map data tiles from a server. In some embodiments, bandwidth considerations may depend on checking whether a current bandwidth/time-to-download for retrieving map data tiles is above a threshold. For example, one of the client devices 16-22 may check a current download rate of a retrieval process to determine whether to retrieve additional map data tiles corresponding to a larger tile radius.

Processor capacity for performing map database access may be considered. For example, a current processor capacity may be checked against a threshold. This may be the case when a current condition of the mapping application requires reduced data retrieval and/or processing due to processor load. For example, where the processor is overloaded or backed up (the processor capacity is low or below a threshold), the map data tile radii may be shortened to reduce the total amount of map data tiles retrieved and processed, thereby lessening processor workload.

Further, the sequence and amount of the pre-fetch map data tiles may be based on memory conditions. For example, there may be a limited amount of memory allocated for pre-fetch map data. The corresponding areas of map data tiles may be scaled appropriately to take into account a memory budget. The sequence of retrieval may be reordered based on a memory budget. Alternatively, the number of map data tile sets may be reduced based on the memory budget.

Any suitable subset of the blocks of FIGS. 9 and 13 may be implemented in any suitable order by a number of different devices (e.g., client or server) and remain consistent with the method and system described herein. Moreover, additional determination blocks may be added to refine the filtering of style parameters subject to interpolation processing.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for pre-fetching map data for a route in response to an initiation of a routing function of a mapping application, comprising:

initiating a first routing function, using a computer, to generate a route, the route defined by an origin, a destination, and a set of paths connecting the origin to the destination;

determining, using the computer, a first tile radius associated with the origin wherein the first tile radius defines a first set of map data tiles of a first zoom level corresponding to a first map surface area around and including the origin;

determining, using the computer, a second tile radius associated with the destination, wherein the second tile radius defines a second set of map data tiles of the first zoom level corresponding to a second map surface area around and including the destination;

determining, using the computer, a set of points along the route between the origin and the destination and a set of map tile radii for the set of points, wherein the set of map tile radii define a third set of map data tiles of the first zoom level corresponding to a set of map surface areas around and including the set of points along the route, wherein at least one of the first tile radius, the second tile radius, and one of the set of map tile radii are different from each other;

determining, using the computer, a fourth set of map data tiles of a second zoom level different than the first zoom level, wherein the fourth set of map data tiles are defined by at least one of the first tile radius, the second tile radius, or one of the set of map tile radii, and wherein the fourth set of map data tiles provides a different magnification of corresponding map areas than the first, the second, or the third map data tiles;

retrieving from an external map database the first, the second, the third and the fourth sets of map data tiles, wherein the map database stores a plurality of map data tiles, and the first, the second, the third and the fourth sets of map data tiles comprise a subset of the plurality of map data tiles of the map database;

storing the first, the second, the third and the fourth set of map data tiles in a local memory as a first, a second, a third and a fourth set of pre-fetch map data tiles, respectively, wherein the local memory is different from the map database;

initiating a first rendering function to display at least a portion of the route at the first zoom level using at least one of the first, second, or the third set of pre-fetched map data tiles of the local memory instead of map data tiles of the external map database; and initiating a second rendering function to display at least a portion of the route at the second zoom level using the fourth set of pre-fetched map data tiles of the local memory instead of map data tiles of the external map database, wherein the fourth set of map data tiles is retrieved from the external map database and stored in the local memory prior to initiating the first rendering function.

2. The computer-implemented method of claim 1, wherein each of the first set of map tile radii is determined so that points along the route closer to the origin and destination have shorter radii than points along the route further from the origin and destination.

3. The computer-implemented method of claim 1, wherein one of the set of points along the route corresponds to a location on the route of high priority, and wherein a map tile radii corresponding to the point of high priority is larger than a point of low priority.

4. The computer-implemented method of claim 1, wherein determining the first, the second, and each of the first set of map tile radii is based on an allocated memory size of the client device.

5. The computer-implemented method of claim 1, further including determining that at least one of the first tile radius, the second tile radius and one of the first set of map tile radii is larger when a viewing window is centered on one of the first tile radius, the second tile radius or one of the first set of map tile radii.

6. The computer-implemented method of claim 1, wherein the fourth set of map data tiles are defined by a point along the route when that is within a threshold distance of a viewing window center.

7. The computer-implemented method of claim 1, further including determining, using the computer, a fourth tile radius associated with a point of interest not along the route and wherein the fourth tile radius defines a fourth set of map data tiles corresponding to a location not along the route with high priority, accessing from the map database the fourth set of map data tiles, and storing the fourth set of map data tiles in the local memory as a fourth set of pre-fetch map data tiles, wherein initiating the second rendering function uses the fourth set of pre-fetch map data tiles.

8. The computer-implemented method of claim 1, further including determining the first tile radius, the second tile radius, and the first set of map tile radii to be smaller when a bandwidth of the client device is below a threshold than when the bandwidth is above the threshold and to be smaller when a processor load of the client device is above a threshold than when the processor load is below the threshold.

9. A computer device comprising:
a communications network interface;
one or more processors;
one or more memories coupled to the one or more processors;
a display device coupled to the one or more processors;
wherein the one or more memories include computer executable instructions stored therein that, when executed by the one or more processors, cause the one or more processors to
initiating a first routing function, using a computer, to generate a first route, the first route defined by an origin, a destination, and a set of paths connecting the origin to the destination;
determine a first set of map tile radii associated with a set of points along the first route including the origin and the destination, wherein first set of map tile radii define a first set of map data tiles at a first zoom level corresponding to map surface areas around and including the first route;
determine a second set of map data tiles at a second zoom level different than the first zoom level, wherein the second set of map data tiles are defined by at least one of the first set of map tile radii wherein the second set of map data tiles provides a different magnification of corresponding map areas than the first set of map data tiles;
retrieve from an external map database the first set of map data tiles and the second set of map data tiles, wherein the map database stores the map data as a plurality of map data tiles, and the first set of map data tiles and the second set of map data tiles comprise a subset of the plurality of map data tiles of the map database;
store the first set of map data tiles and the second set of map data tiles in a local memory as a first set and a second set of pre-fetched map data tiles, respectively, wherein the local memory is different from the map database;
initiating a first rendering function to display at least a portion of the first route using the first set of pre-fetched map data tiles of the local memory instead of map data tiles of the external map database; and
initiating a second rendering function to display at least a portion of the route at the second zoom level using the second set of pre-fetched map data tiles, wherein the second set of map data tiles is retrieved from the external map database and stored in the local memory prior to initiating the first rendering function.

10. The computer device of claim 9, further including instructions to determine the first set of pre-fetched map data tiles at a first zoom level to correspond with an area that completely encompasses the entire route and that is displayable within a single viewing window at a first zoom level.

11. The computer device of claim 9, further including a second routing function to generate a second route that includes an origin, a destination, and a set of paths connecting the origin and the destination of the second route;
determine a third set of map tile radii associated with a set of points along the second route including the origin and the destination of the second route, wherein third set of map tile radii define a third set of map data tiles corresponding to map surface areas around and including the second route;
access, from a map database, the third set of map data tiles corresponding to the second route, wherein the map database stores the map data as a plurality of map data tiles, and the third set of map data tiles comprises a subset of the plurality of map data tiles of the map database; and
store the third set of map data tiles in the local memory as a third set of pre-fetched map data tiles, wherein initiating the rendering function uses the third set of pre-fetched map data tiles instead of map data tiles of the map database.

12. The computer device of claim 11, wherein the second route is a return route of the first route and wherein the origin of the first route is the destination of the second route and the destination of the first route is the origin of the second route.

13. The computer device of claim 11, wherein the origin of the second route is along the first route and the destination of the second route is a point of interest within the vicinity of the first route.

14. A computer device comprising:
a communications network interface;
one or more processors;
one or more memories coupled to the one or more processors;
a display device coupled to the one or more processors;
wherein the one or more memories include computer executable instructions stored therein that, when executed by the one or more processors, cause the one or more processors to:
initiate a routing function, using a computer, to generate a route, the route defined by an origin, a destination, and a set of paths connecting the origin to the destination;
determine a first set of map data tiles at a first zoom level corresponding to a first map surface area around and including the origin, a second set of map data tiles at the first zoom level corresponding to a second map surface area around and including the destination, a third set of map data tiles at the first zoom level corresponding to a third map surface area around the route between the origin and the destination, wherein a route map surface area includes the first map area around and including the origin, the second map area around and including the destination and the third map surface area around and including the route;
determine a fourth set of map data tiles at a second zoom level different than the first zoom level, wherein the fourth set of map data tiles correspond to an area along the route, and wherein the fourth set of map data tiles provides a different magnification of the corresponding map area than the first, the second, or the third map data tiles;

retrieve from an external map database, the first set, the second set, third and the fourth set of map data tiles, wherein the map database stores the map data as a plurality of map data tiles, and the first, second, third and fourth set of map data tiles comprise a subset of the plurality of map data tiles of the map database;

store the first set, the second set, third and the fourth set of map data tiles in a local memory as a first, a second, third and a fourth set of pre-fetched map data tiles, respectively, wherein the local memory is different from the map database;

initiate a first rendering function to display at least a portion of the route at the first zoom level using at least one of the first, second, or the third set of pre-fetched map data tiles of the local memory instead of map data tiles of the map database; and initiate a second rendering function to display at least a portion of the route at the second zoom level using the fourth set of pre-fetched map data tiles of the local memory instead of map data tiles of the external map database, wherein the fourth set of map data tiles is retrieved from the external map database and stored in the local memory prior to initiating the first rendering function.

15. The computer device of claim 14, further including instructions to retrieve, from the map database, the first set, the second set, the third set and the fourth set of map data tiles in a sequence based on a current bandwidth of communications between the computer device and a server.

16. The computer device of claim 14, further including instructions to determine an amount of the first, the second, and the third set of map data tiles to retrieve from the map database based on a current bandwidth of communications between the computer device and a server.

* * * * *